CARD RECORDING AND SCANNING APPARATUS

Filed May 23, 1960 3 Sheets-Sheet 1

INVENTOR.
WENDELL S. MILLER
BY William P. Green
ATTORNEY

Aug. 7, 1962 W. S. MILLER 3,048,097

CARD RECORDING AND SCANNING APPARATUS

Filed May 23, 1960 3 Sheets-Sheet 2

INVENTOR.
WENDELL S. MILLER
BY William P. Green
ATTORNEY

CARD RECORDING AND SCANNING APPARATUS

Filed May 23, 1960 3 Sheets-Sheet 3

INVENTOR.
WENDELL S. MILLER
BY William P. Green
ATTORNEY

United States Patent Office 3,048,097
Patented Aug. 7, 1962

3,048,097
CARD RECORDING AND SCANNING APPARATUS

Wendell S. Miller, 1341 Comstock Ave., Los Angeles, Calif.
Filed May 23, 1960, Ser. No. 30,954
21 Claims. (Cl. 101—47)

This invention relates to improved apparatus for use in conjunction with a series of identification cards, such as credit cards, library cards, or the like, the term "card" being used in this application in a generic sense to include any thin sheet-like or plate-like identification element, whether formed of plastic, paper, metal, or any other material.

In using a card system in which a large number of individual identification cards are outstanding, it frequently becomes desirable to remove one or more cards from circulation, because the owner or owners have failed to pay for prior items purchased, or have performed other acts indicating that the card should not be honored. In the past, lists of such cards have been sent to the various service stations, restaurants, or other establishments which honor the cards, so that these establishments may check the list before honoring any card. However, in view of the amount of time which is required for thus checking every card which is submitted, and because the offending cards are not actually discovered very often, most operators at service stations and the like do not in fact check the cards against the lists. Consequently the conventional system is not very effective in weeding out improper cards.

Each time that a card of the above discussed type is employed for its intended purpose, the individual to whom the card is submitted places the card in a special recording device which functions to print a sales slip or make some other record of the transaction from the card. A major object of the present invention is to provide an improved device for this purpose, which, in addition to making the permanent record of the transaction from the card, will also serve a second purpose of automatically scanning each card which is submitted to make certain that the card is not one which should be withdrawn from circulation. For this purpose, the device is adapted to receive and hold a master sheet having on it indicia representing all of the different cards which at a particular time should be withdrawn from circulation. Upon each operation of the unit, the device functions to compare each of the sets of markings on the master sheet with the identifying markings or indicia on the card being handled, to see whether that card should be withdrawn. If the card is one to be withdrawn from circulation, the device indicates this to the operator.

The above and other features and objects of the present invention will be better understood from the following detailed description of the typical embodiments illustrated in the accompanying drawings in which.

Figures 1, 2, 3, 4, 8, 9, 22:
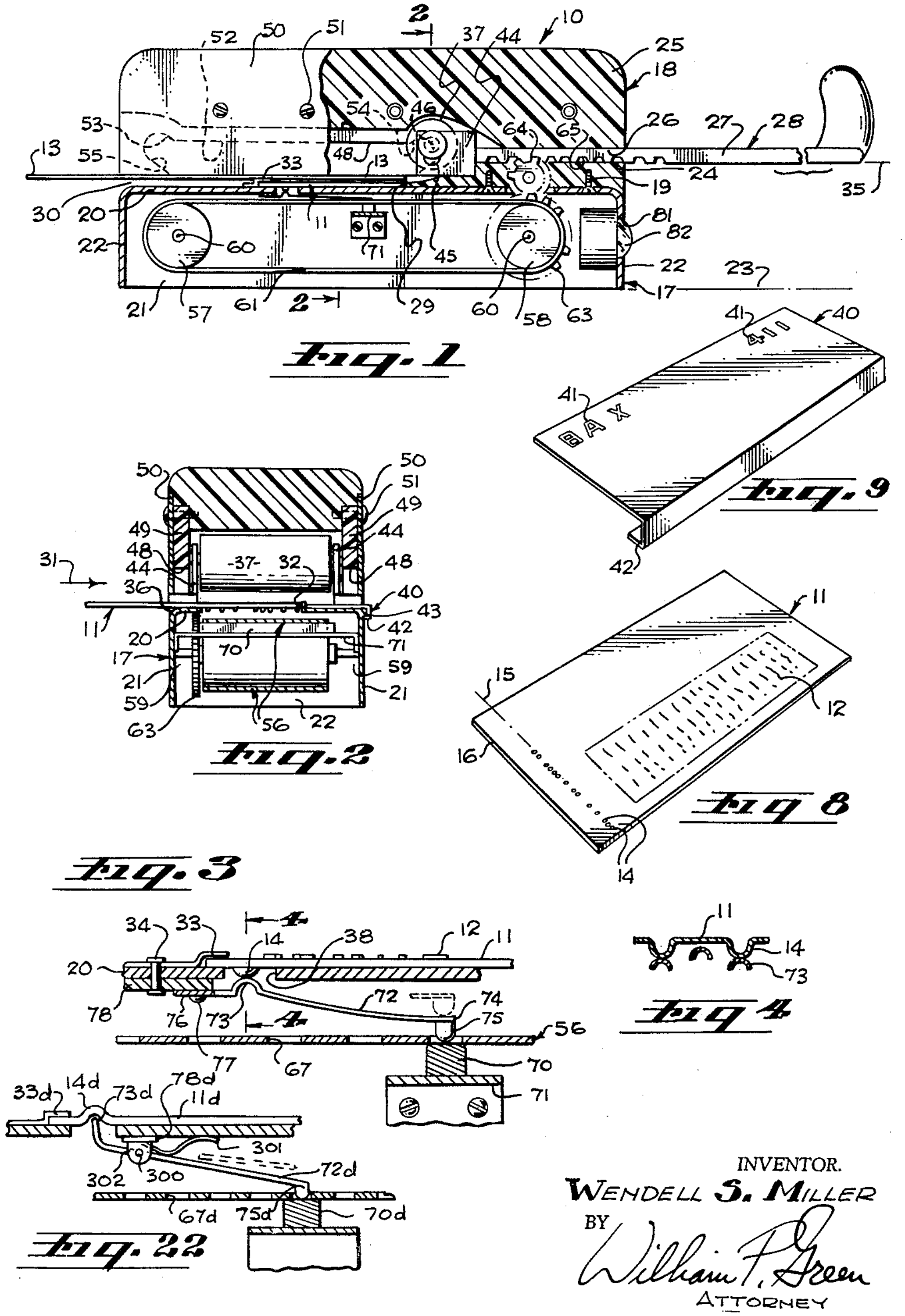
FIG. 1 is a side view, partially broken away, of a first form of device embodying the invention.
FIG. 2 is a vertical section taken on line 2—2 of FIG. 1.
FIG. 3 is an enlarged fragmentary vertical section through a portion of the FIG. 1 device at the location of one of the electrical contacts.
FIG. 4 is a fragmentary transverse section taken on line 4—4 of FIG. 3.
FIG. 8 is a perspective view of one of the cards for use with the device of FIG. 1.
FIG. 9 is a perspective view of a plate which is used with the FIG. 1 device for imprinting additional information on the record sheet.
FIG. 22 shows fragmentarily another form of the invention.

Referring first to FIGS. 1 to 10, and particularly to FIG. 1, I have shown at 10 a device of the general type commonly used in service stations and other business establishments for printing a sales slip or record from a credit card 11 at the time a sale is made. The credit card, as typically represented in FIG. 8, may be formed of a fairly stiff, thin resinous plastic material, having the name, address, and any other desired identification of the card holder printed on the card at 12, in the form of raised letters. These letters are pressed against a sales slip 13 (see FIG. 1), which slip may carry a sheet of carbon paper at its underside, so that the raised lettering at 12 will print onto the sales slip a permanent impression. In addition to the raised lettering 12, card 11 also has a series of downwardly projecting bumps or dimples 14 which function as a further coded identification of the card holder. The dimples 14 may have the rounded configuration illustrated in FIG. 4, the lower portion of each dimple typically being essentially hemispherical, and therefore rounded in all directions. Also, the dimples 14 are typically all aligned in the direction indicated by broken line 15 of FIG. 8, which line may extend parallel to an edge 16 of the card. On each card 11, there are a certain predetermined number of locations along line 15 at which dimples 14 may occur, but the cards do not actually have dimples at all of these possible locations. Instead, different cards have different arrangements of dimpled and undimpled areas, with each individual arrangement of dimples constituting a coded identification of a particular card holder. In the form of the invention shown in FIGS. 1 through 10, it may be assumed that all of the individual cards have exactly the same number of dimples (though spaced differently), a preferred arrangement being one in which each card has 11 identification dimples out of 22 possible dimple locations.

The main body of the device 10 may be constructed of a plurality of sections, including a lower section 17 formed of sheet metal or the like, and an upper section 18 rigidly secured to lower section 17 in any suitable manner, as by screws represented at 19 (see FIG. 1). Bottom section 17 has a top wall 20 which may be essentially rectangular in horizontal section, and which has depending side walls 21 and end walls 22 for engagement with the surface 23 of a table or the like on which the device is placed. The screws 19 extend upwardly into a portion 24 of upper body section 18, which portion is integral with the top part 25 of section 18, and contains near its opposite sides two parallel guideways 26 within which two arms 27 of an actuating handle 28 are slidably received. Portion 24 rests on and is attached to the upper surface of portion 20 of section 17 at one end of the device, but terminates at a location 29 such as to leave a narrow horizontal slot or recess 30 directly above the upper portion 20 of section 17, for reception of card 11 and the record sheet 13.

Card 11 is slipped horizontally into the slot 30 to the position shown in FIGS. 1, 2 and 3, and in the direction represented by arrow 31 of FIG. 2. Such insertion of the card is limited by engagement of an inner edge of the card with an upstanding lug or set of lugs represented at 32 in FIG. 2, while the edge 16 of the card is accurately positioned relative to lower section 17 of the body by reception beneath a locating flange or bracket shown at 33 in FIGS. 1 and 3. Bracket 33 may be secured in fixed position relative to section 17 by rivets 34 or otherwise, and may extend directly transversely of the length of the device 10, and therefore of the axis 35 of movement of handle 28. The bracket 33 may have the cross-section represented in FIG. 3 from the location of shoulder 32 to the left edge 36 of section 17, as viewed in FIG. 2. Also, the stop shoulder 32 may extend directly longitudinally of the device, and along the entire length of card 11.

When the card 11 is in the position represented in FIGS. 2 and 3, the raised markings 12 are so located as to be directly beneath the path of movement of a printing roller 37. Also, the dimples 14 are so located as to be positioned within a transversely extending elongated slot or aperture 38 formed in top wall 20 of section 17, and to project downwardly into that slot for engagement with a series of electrical contacts in a manner to be described at a later point. Rightwardly beyond stop shoulder 32, in FIG. 2, the top wall 39 of body section 17 is shaped to receive and hold a printing plate 40, which may be shaped as shown in FIG. 9, and which has raised letters or indicia 41 indicating the particular service station or other establishment at which the device 10 is maintained. The indicia 41 are also located directly beneath the path of roller 37, so that the roller simultaneously prints the information of markings 12 and markings 41 on sheet 13. Plate 40 may have an inturned flange 42 along its edge adapted to grip a laterally projecting portion 43 of body section 17, in a manner effectively holding plate 40 in the illustrated position on section 17.

Roller 37 is adapted to be actuated in the direction of axis 35 by movement of handle 28 along that axis. For this purpose, each of the two parallel arms 27 of handle 28 may carry a thin vertically extending block or element 44 at its inner end, containing a vertical slot 45 within which a pin or axle 46 projecting from the end of roller 37 is received and confined. This pin and slot connection thus actuates the the roller 37 horizontally with handle 28, while allowing limited vertical movement of the roller by virtue of the pin and slot connection 45—46. Axially outwardly beyond the reduced portions 46 of the roller mounting pins, these pins have enlarged diameter portions 47, which are received within guide slots 48 formed in a pair of parallel vertical guide plates 49 extending along opposite sides of upper body section 18. These plates 49 and a pair of outer cover plates 50 are secured to section 18 in any suitable manner, as by screws represented at 51. The two guide slots 48 at opposite sides of the roller may be identical, each having an elongated horizontal portion 52 extending along the entire length of card 11 when in the FIG. 1 position, and each having two angularly upwardly inclined end portions 53 and 54 at opposite ends of horizontal portion 52. As will be apparent, the downwardly facing upper edges of horizontal portions 52 of the two slots hold roller 37 downwardly in a printing position while the roller passes along the horizontal portions of the slots, and then when the roller reaches either end of its range of travel, engagement of portions 47 of the roller mounting pins with one of the inclined surfaces 55 acts to cam the roller upwardly to a position in which it will not interfere with removal or insertion of card 11 or record sheet 13. Roller 37 may be formed of rubber or other material, and be cylindrical in shape, and adapted to press downwardly far enough to always insure the proper imprinting on the sheet 13 of the impressions of indicia 12 and 41. Also, the flange 32 should be shallow enough to avoid interference with proper downward movement of the roller into a printing position.

During the time that the device 10 is making a record on sheet 13 of the information on card 11, the apparatus contained within the lower section 17 of the device functions to automatically scan the indicia 14 on the card to determine whether the particular card in question should be withdrawn from circulation. The apparatus for performing this function includes a flexible sheet 56 of plastic, paper, or the like, which is furnished to each of the service stations, and is revised periodically, and carries indicia representing all of the cards 11 which are not to be honored. This sheet 56 is illustrated as taking the form of an endless belt, which is adapted to be mounted about two sprocket rollers 57 and 58 rotatably mounted by bearings such as those represented at 59 (FIG. 2) for rotation about two horizontal parallel axes 60 (FIG. 1). The sheet 56 may be supplied to the individual business establishment in the form of an elongated strip, whose ends may be easily spliced or clamped together by a splicing connection represented at 61 to form the illustrated belt. As seen best in FIG. 6, the belt has along its opposite edges sprocket openings 62 by which it is keyed to the two rollers 57 and 58. For driving one of these rollers, and therefore the belt, in accordance with in and out movement of handle 28, the roller 58 carries at one end a drive gear 63, which may mesh with an idler 64 journalled in housing section 18, with that idler in turn engaging rack teeth 65 provided at the underside of one of the handle arms 28, to thereby advance belt 56 along an endless path and through a predetermined range of movement in response to movement of handle 28 in either direction along axis 35.

Figures 5, 6, 7, 10, 11, 12, 13:
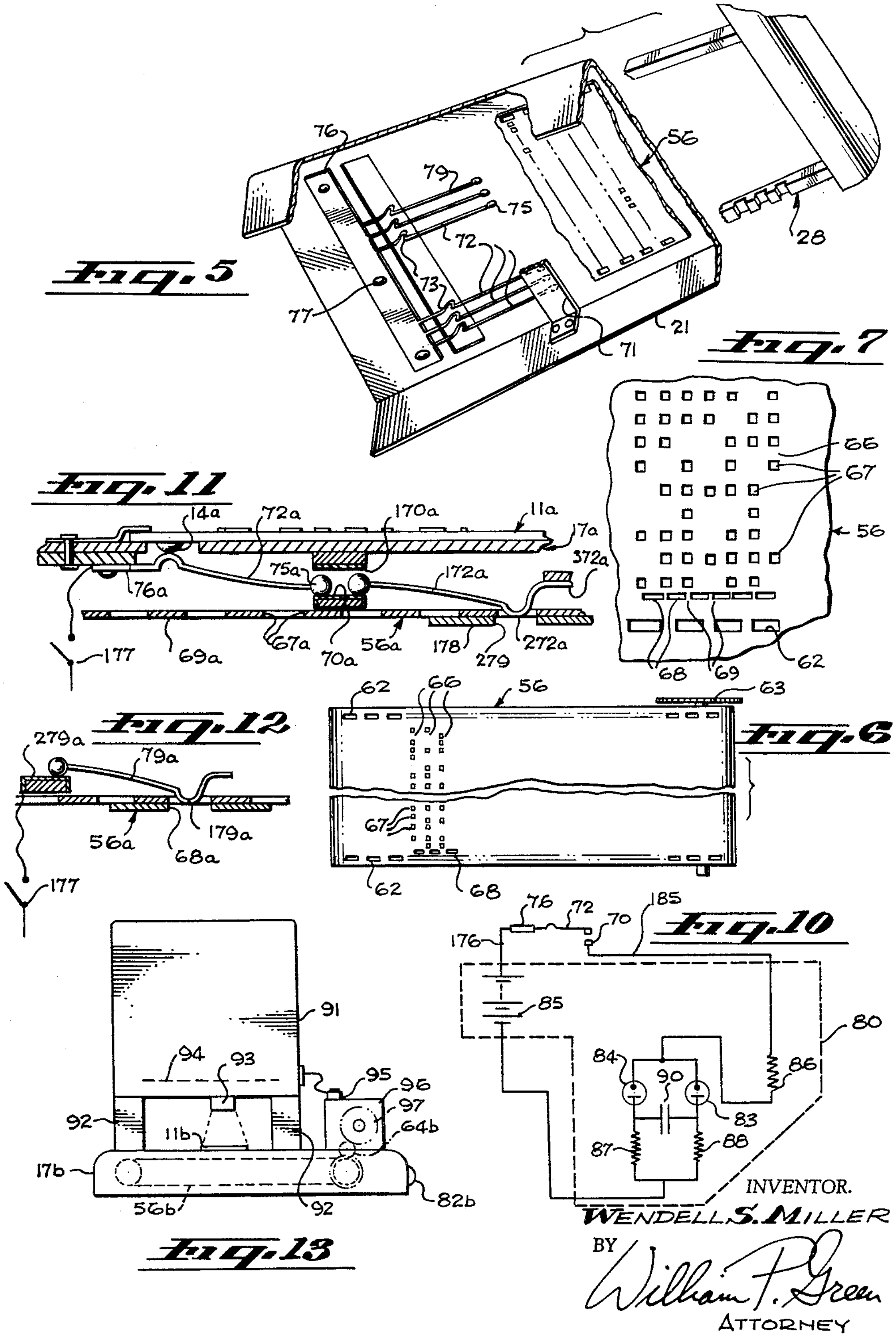
FIG. 5 is a fragmentary perspective view of the contact portion of the device as it appears from the underside of the unit.
FIG. 6 is a plan view of the belt or sheet which carries indicia representing the different cards which are to be withdrawn from circulation.
FIG. 7 is an enlarged fragmentary representation of the FIG. 6 belt.
FIG. 10 is a circuit diagram showing the electrical circuit of the FIG. 1 device.
FIG. 11 is a view similar to FIG. 3, but showing a variational form of contact system.
FIG. 12 is a view showing an end one of the contacts of the FIG. 11 device.
FIG. 13 is a view representing another form of the invention.

Referring now to FIGS. 6 and 7, the indicia formed on belt 56 desirably take the form of a series of transverse rows 66 of apertures, the individual apertures being represented at 67. Each row of apertures has positions for as many apertures as there are possible positions for the dimples 14 on cards 11. For example, in the preferred arrangement being discussed there may be twenty-two possible aperture locations across the width of belt 56. However, only certain of these possible locations actually contain apertures in each of the rows, for example 11 out of the possible 22. The arrangement of apertures and unapertured areas along each of the rows 66 corresponds to the arrangement of dimples in a particular one of the cards 11 which is not to be honored. It is found preferable that the unapertured locations in the rows 66 correspond to the dimples 14 on cards 11, in order to attain maximum simplicity in the response mechanism. That is, if one of the rows 66 represents the particular card shown at 11 in FIG. 8, then that row 66 will have apertures at those locations where dimples 14 do not occur on the card, and will have unapertured areas at those locations where the dimples do occur.

Extending along one end of the rows 66, there is another series of apertures 68, which are of uniform length and spacing along the entire length of the tape, and each of which in effect bridges the space between one aperture row 66 and the next successive row. That is, each of the apertures 68 is elongated longitudinally of tape 56, and has one of its ends received transversely opposite and longitudinally overlapping the apertures in one row 66, while the other end of the same aperture 68 is received transversely opposite and overlaps the apertures in the next successive row. Between successive apertures 68, there are spaces 69 transversely opposite the central portions of the apertures within one of the rows 66, and which spaces are unapertured. The material of tape 56 is so selected as to be strong enough to withstand damage as a result of engagement with the electrical contacts controlled thereby, during repeated operations of the device in the manner to be brought out subsequently.

At a location beneath a portion of the upper run of belt 56, the lower body section 17 stationarily carries an electrically conductive elongated bus bar or contact 70, extending transversely of the direction of movement of belt 56, and therefore extending parallel to the direction in which the individual rows 66 of apertures 67 extend on the belt. This bus bar 70 may have the cross-sectional configuration represented in FIG. 3, and is positioned to engage the undersurface of the top run of tape 56, entirely across the transverse extent of the tape. The bus bar 70 may be mounted within the body in any suitable manner, as by means of an electrically insulative mounting bracket represented at 71, and secured at its opposite ends to the side walls 21 of body section 17.

For coaction with bus bar 70, body section 17 carries a series of electrical contacts 72 (see FIGS. 3 and 5), which may be identical and of the shape illustrated in FIG. 3. At a point 73, each contact has an upwardly curved portion positioned to engage and be deflected by one of the dimples 14 on card 11. The free ends 74 of contacts 72 may carry downwardly projecting contact lugs 75, whose lower ends are hemispherically rounded as shown. At their opposite ends, the different contacts 17 may all be electrically connected together, as by stamping all of the contacts from a single piece of sheet metal, so that they all project from and are integral with a single transverse strip 76 of the metal, which is mounted stationarily at the underside of body wall 20, as by attachment by screws 77 to an insulative element 78 which acts to insulate strip 76 and contacts 72 from body 17.

The contacts 72 are yieldingly urged upwardly by their own resilience to a position above that shown in full lines in FIG. 3, and typically to the broken line position of FIG. 3. When a particular one of the contacts 72 is in its upper broken line position, the curved portion 73 is higher than is shown in FIG. 3. If one of the dimples 14 then moves into engagement with upwardly projecting portion 73 of that contact, the dimple presses the contact downwardly to the FIG. 3 position, and into engagement with bus bar 70 (if one of the apertures 67 in tape 56 is so located as to pass contact lug 75 through the tape and into engagement with the bus bar). To allow such downward camming of contacts 72 by the dimples 14, the upwardly curved portion 73 of contacts 72 may be dome shaped or substantially hemispherical, as seen in FIGS. 3 and 4, to curve both longitudinally and transversely. Contacts 72 are also built strongly enough to effectively withstand deflection transversely of their length by dimples 14 upon insertion of card 11 into its active position in device 10, or removal of the card therefrom. The only movement of the contacts by dimples 14 is vertically between the broken line and full line positions of FIG. 3.

The number of contacts 72 which are provided corresponds to the number of possible locations for the dimples 14 on card 11, and also to the number of possible aperture locations along each series of apertures 66 of tape 56. When card 11 and tape 56 are in their FIG. 3 positions, the upwardly projecting portions 73 of the different contacts are positioned in vertical alignment with the different possible locations of dimples 14 on card 11, and the contact lugs 75 of the different contacts 72 are positioned opposite the different possible aperture locations within one of the series of apertures 66 of tape 56. As the tape is advanced along its endless path, the different sets 66 of apertures 67 are successively brought to positions of coaction with contact lugs 75, so that those lugs 75 which are pressed downwardly by dimples 14 may engage bus bar 70 at those locations at which the apertures 67 occur. At one end of the row of contacts 72, there is an additional contact 79, which is also carried by and integral with strip 76, and which is positioned to coact with the end series of apertures 68 in tape 56. This end contact 79, instead of being yieldingly urged upwardly to the broken line position of FIG. 3, is yieldingly urged by its own resilience to the lower full line position represented in FIG. 3, and into engagement with bus bar 70 during those periods when lug portion 75 of the contact 79 is received within one of the apertures 68. This contact 79 thus maintains electrical contact continuously between the conductive element 76 and bus bar 70, except during those intervals when the lug 75 of contact 79 is in engagement with the unapertured portions 69 of strip 56. At these locations, the circuit between elements 76 and 70 is broken, unless one of the other contacts 72 engages bus bar 70 through one of the apertures 67.

For response to the scanning system which includes contacts 72, I provide an electrical circuit which may take the form of that shown in FIG. 10. The portion of this circuit which is contained in the broken lines 80 of FIG. 10 may be located within a small inner housing 81 in body section 17, having a transparent dome or lens 82 at one side through which a neon signal light or glow tube 83 is visible to an operator from the outside of the housing 17. In addition to the lamp 83, the circuit of FIG. 10 may include also a second and identical lamp or tube 84, an energizing battery 85, resistors 86, 87 and 88, and a capacitor 90. These elements are connected in the arrangement shown in FIG. 10, with resistor 86 being connected to bus bar 70, and with the positive side of battery 85 being connected to base strip 76 of the contacts 72 and 79. Circuit 10 constitutes a multivibrator or flip-flop circuit, which acts upon an initial closure of the circuit at bus bar 70 to energize lamp 83, and which responds to a subsequent momentary breaking of the circuit at bus bar 70, and then reclosure of the circuit, to convert to a condition in which the visible bulb 84 is energized. To serve this function, the various components of the circuit in FIG. 10 may typically have the following values:

| | |
|---|---|
| Battery 85 | 135 volts. |
| Resistor 86 | 15 megohms. |
| Resistor 87 | 5 megohms. |
| Resistor 88 | Do. |
| Capacitor 90 | .02 mfd. |
| Neon lamps 83 and 84 | General Electric NE–2 with lamp 83 being selected to have a slightly lower striking voltage than lamp 84 in the illustrated circuit. |

To now describe a complete cycle of operation of the device shown in FIGS. 1 through 10, assume that a band or tape 56 has been properly mounted within the apparatus, carrying a series of groups of the apertures 66 representing cards which are to be removed from circulation. Assume also that the handle 28 is initially in the end position represented in FIG. 1. With the apparatus in this condition, the operator inserts a particular one of the cards 11 laterally into slot 30, to the position represented in FIGS. 1, 2 and 3. Also, the operator inserts above the card the record sheet represented at 13, which may be a sales slip. A portion of slip 13 is received directly above the raised letters 12 on card 11, and also directly above the raised letters or markings 41 on plate 40.

The insertion of card 11 to the position of FIGS. 2 and 3 acts to deflect downwardly certain of the contacts 72, at the locations at which dimples 14 occur on card 11. It may be assumed, however, that when handle 28 is in one of its end positions, as for instance that of FIG. 1, none of the apertures 67 are located opposite lugs 75 of contacts 72. The lug 75 of contact 79, on the other hand, is received in an end one of the apertures 68, and therefore closes the circuit between element 76 and bus bar 70. The contact 79 is the innermost one, that is, the last one to be engaged by a dimple on card 11 upon insertion of the card into its position of use, so that the end dimple acts to close the circuit through contact 79 as the card reaches its innermost position.

This initial closure of the circuit at bus bar 70 produces a potential across lamp 83 which exceeds the striking voltage of that lamp and therefore causes it to glow. Lamp 84 does not glow because it has been pre-selected to have a slightly higher striking voltage than lamp 83, and because after lamp 83 is lighted the potential across lamp 84 is much lower than its striking potential. After lamp 83 commences to glow, current flows from battery 85 through resistor 88, tube 83, resistor 86, contacts 70 and 76 and back to the battery. The illuminated tube 83 is usually not visible to the operator, and therefore does not give a signal to the operator.

After the card 11 and sheet 13 have been positioned in the device, the operator actuates handle 28 manually from its FIG. 1 position to the opposite position in which the roller trunnions are received within the opposite inclined ends of slots 52 (or if the handle is initially in its leftward position, then the actuation of the handle may be to the right, through its permitted range of movement). Such movement of the handle causes the roller to first be cammed downwardly, and then be held down by the horizontal portion of slot 52 during most of the handle movement, to thereby press sheet 13 and the carried carbon paper tightly against plate 40 and card 11 and in that way imprint the name, address, etc. of card 11, and the markings 41 of plate 40, on sheet 13. At the same time, the handle actuation serves through gears 64 and 63 to advance belt 56 along its endless path through a predetermined range of movement. This advances the different series 66 of apertures 67 successively into positions of alignment with contact lugs 75, so that if any aperture is located opposite one of the contacts 75 which has been depressed by a dimple 14 of card 11, that contact which is thus both depressed and located opposite an aperture will engage bus bar 70. The circuit to the bus bar 70 through the end contact 79 is broken only when that contact is in engagement with one of the unperforated areas 69 of tape 56. At these points, the electrical connection between element 76 and bus bar 70 will always be maintained through at least one of the contacts 72 unless a group 66 of apertures 67 is encountered which represents the particular card 11 that has been inserted into the apparatus. When apertures of this type are encountered, then the pattern of the unapertured areas in that set of apertures will correspond exactly with the pattern of the dimples 14 of the card 11 (ignoring the end dimple which coacts with end contact 79), and consequently all of the depressed contacts 72 will be held out of engagement with bus bar 70 by unapertured portions of the sheet 56. As a result, the circuit between element 76 and bus bar 70 will be momentarily broken, and then closed again when the next successive aperture 68 is encountered by contact 79. Such momentary opening of the circuit causes the multivibrator circuit of FIG. 10 to flip over to a condition in which the visible neon lamp 84 is energized, rather than the initially lighted lamp 83. This occurs because, when the circuit is broken at contacts 70 and 76, the lamp 83 will immediately cease to glow; and then when the circuit is closed again, the charge which had been developed on capacitor 90 during the period of glow of lamp 83 causes the potential to be greater across lamp 84 than lamp 83, whereby lamp 84 will glow and lamp 83 will not. The lamp 84 remains in this illuminated condition as long as card 11 remains in the apparatus, to indicate to the operator that the card should be withdrawn from use, or at least that credit should not be granted to the holder of the card.

FIG. 11 shows fragmentarily a second form of the invention, which may be considered to be identical with that of FIGS. 1 to 10, except for the particular contact system which is employed for scanning tape 56a (corresponding to tape 56 of FIG. 1). This contact system of FIG. 11 is designed to function with coding arrangements in which all of the cards 11a do not necessarily have exactly the same number of dimples 14a. When this condition occurs, it is necessary to respond separately to the presence of both the apertures 67a and the dimples 14a, rather than responding merely to a situation in which all of the dimples correspond to all of the unapertured areas. In the FIG. 11 arrangement, the dimple actuated contacts 72a (corresponding to contacts 72 of FIGS. 1 to 10) carry contact heads 75a each of which is normally yieldingly urged upwardly against a coacting stationary contact 170a, and is deflectable downwardly by a dimple 14a into engagement with a second contact 70a. A second series of contacts 172a (one for each aperture location) are yieldingly urged downwardly into engagement with the corresponding contacts 70a, and are deflectible upwardly into engagement with contacts 170a when the curved portions 272a engage unapertured areas of tape 56a. In this form of the invention shown in FIGS. 11 and 12, there is no necessity for the extra end contact 79 of FIG. 5, in alignment with the upper contacts 72a. Instead, there is provided an end contact 79a (FIG. 12) shaped in correspondence with the lower contacts 172a, and connected to the same base strip 372a which carries the contacts 172a. Contact 79a has its curved portion 179a positioned to project downwardly into apertures 68a of tape 56a (corresponding to apertures 68 of FIG. 7), and when portion 179a is thus received within an aperture 68a, the resilience of contact 79a urges that contact downwardly into engagement with a stationary contact 279a which is connected to lead 176 of FIG. 10 through a control switch 177.

The stationary contacts 170a associated with the different pairs of contacts 72a and 172a are not connected electrically to one another. Similarly, contact 279a and the various contacts 70a associated with the different pairs of contacts 72a and 17a are not connected to one another electrically.

The electrical circuit used in conjunction with the FIG. 11 contact arrangement is the same as that shown in FIG. 10 except that the contacts of FIG. 11 are substituted for contacts 72 and 70, and an added manually actuated control switch 177 is also connected into the circuit. More particularly, the common base or carrier portion 372a of contacts 172a and 79a is connected to lead 185 of FIG. 10, in place of the connection of bus bar 70 thereto; while strip 76a and contact 279a are both connected to lead 176 of FIG. 10 through switch 177. To prevent downward deformation of belt 56a by contacts 172a and 79a, there may be provided beneath the belt at the location of the contacts a horizontal rigid backing plate 178, rigidly and stationarily attached to the body part 17a, and having apertures or an elongated transverse slot at 279 for avoiding interference with downward movement of portion 272a of contacts 172a.

In the arrangement of FIGS. 11 and 12, the switch 177 is left in opened condition until card 11a is fully inserted into its FIG. 11 printing position within the device. At the time that the card is thus inserted into position, the actuating handle 28 (FIG. 1) and roller 37 are in one of their end positions, and consequently contact 79a of FIG. 12 is received within one of the apertures 68*a* in tape 56*a*, and is therefore in its lower position of engagement with contact 279*a*. The insertion of card 11*a* into position acts to deflect certain of the elements 72*a* downwardly into engagement with their corresponding contacts 70*a* at the locations at which dimples 14*a* are present on card 11*a*. After the card is completely inserted, switch 177 is closed, to close the circuit between leads 176 and 185 of FIG. 10, through switch 177, and contacts 279*a* and 79*a* of FIG. 12. This energizes neon bulb 83 to place the multivibrator circuit of FIG. 10 in its first stable state. As handle 28 is pulled to perform a printing operation, and to simultaneously advance tape 56*a* past contacts 172*a*, these contacts will act to successively scan the different series of apertures 67*a* of the tape. If one of the sets of apertures 67*a* identifies the same card 11*a* which has been inserted into the device, then the unapertured areas which are distributed within that particular set of apertures will correspond exactly in number and spacing to the dimples 14*a* on card 11*a*. The apparatus is so constructed that each of the contacts 72*a* engages a dimple location on card 11*a* which corresponds to the particular aperture location which is engaged by the associated contact 172*a*. At each location at which a contact 72*a* and the associated contact 172*a* simultaneously engage a dimple 14*a* and an unapertured area on tape 56*a* respectively, the contact 72*a* will be actuated downwardly into engagement with stationary contact 70*a*, and the contact 172*a* will be actuated upwardly into engagement with stationary contact 170*a*, and as a result the electrical circuit between the contact 72*a* and contact 172*a* will be broken. If the reverse occurs, and two associated contacts 72*a* and 172*a* simultaneously engage an undimpled area on card 11*a* and an apertured area on tape 56*a*, then the two contacts 72*a* and 172*a* will engage contacts 170*a* and 70*a* respectively, and again the circuit between contacts 72*a* and 172*a* will be broken. Consequently, if the series of dimples and undimpled areas corresponds exactly to the series of unapertured areas and apertured areas of tape 56*a*, at the particular location being considered in one position of tape 56*a*, the circuit will be broken between each of the contacts 72*a* and the corresponding contact 172*a*. Also, the unapertured area 69*a* between successive apertures 68*a* will momentarily open the circuit between contacts 79*a* and 279*a* (FIG. 12) for an instant during the movement of tape 56*a* past each of the sets of contacts 172*a*. Thus, the circuit between leads 176 and 185 of FIG. 10 will be completely broken if any of the sets of apertures designates the same card which has been positioned in the device. This breaking of the circuit acts in the same manner discussed in connection with the first form of the invention to actuate the circuit of FIG. 10 to its second stable state, in which the indicator lamp 84 is energized, to indicate to an operator that the card 11*a* should not be honored. During the rest of the scanning operation, at least one of the sets of contacts 72*a* and 172*a*, or contact 79*a*, will at all times maintain the circuit between leads 176 and 185 closed, to thus maintain lamp 84 in its energized condition. When handle 28 reaches its end position, contact 79*a* is in engagement with an apertured area on tape 56*a*, and thus will still maintain the circuit closed, until switch 177 is manually opened.

FIG. 13 represents another form of the invention, which is especially adapted for use in conjunction with library cards. In this figure, the base portion 17*b* of the device, and its contents including scanning tape 56*b*, the associated contacts, etc., indicating light 82*b*, and the circuit of FIG. 10, may all be considered to be identical with the base 17 and contained parts of FIG. 1. The library card 11*b* is mounted on the upper surface of base 17*b*, in the same manner as in FIG. 1, and has dimples corresponding to those shown at 14 in the first form of the invention. At the upper side of card 11*b*, the card has the name, address, telephone number, and other identification of the card holder printed visibly thereon, but not necessarily raised as is the corresponding information shown at 12 in FIG. 8 of the first discussed type of card. In FIG. 13, the record of card 11*b* is made photographically, rather than by a printing operation. For this purpose, a camera 91 is mounted above base 17*b*, as by support members 92 projecting upwardly from the base, and has its lens 93 directed downwardly to photograph card 11*b*. The photographic record may typically be formed on microfilm, represented diagrammatically at 94. The camera is controlled by a push button switch represented at 95, which acts upon each depression to cause the camera to take one picture of card 11*b*, and to advance the film automatically to a position for the next successive actuation. The depression of switch 95 also acts to energize a single cycle motor 96, which then operates through a predetermined cycle of operation to advance tape 56*b* in one or both directions along its entire range of movement. For this purpose, motor 96 may drive a gear 97, which meshes with gear 64*b*, corresponding to gear 64 of FIG. 1.

Each time that a library card 11*b* is presented for withdrawal of a book from the library, the operator of the device shown in FIG. 13 places card 11*b* in the position illustrated in FIG. 13, and also positions a second card or identification taken from the book at the location at which plate 40 of FIG. 9 is positioned in the first form of the invention. The push-button switch 95 is then actuated to cause the camera to make a photographic record of card 11*b* and the card which identifies the book. Simultaneously, motor 96 drives belt 56*b*, causing the apparatus within base 17*b* to scan the different series of apertures on the belt to see whether any of those corresponds to the dimples on card 11*b*, indicating that the card should not be honored. If there is correspondence, indicator light 82*b* will be lighted, in the manner discussed previously, to tell the operator that the card should be rejected.

The form of the invention shown in FIGS. 14 through 21 is a device which is similar to that of FIGS. 1 through 10, but is adapted to automatically prevent the printing operation in the event that a card is encountered which should not be honored. The lower section 17*c* of FIGS. 14 through 21, and the contents of that section including the endless tape 56*c*, associated contacts, etc., may all be identical with the corresponding parts of the FIG. 1 device, except for certain changes in the electrical circuit which will be discussed below. The upper section 18*c* is mounted to the lower section at one end thereof, and is spaced vertically from the lower section except at that end to provide a gap 30*c* for receiving card 11*c*, record sheet 13*c*, and a plate such as that shown at 40 in FIG. 9, if desired. The printing action is effected by means of a vertically movable printing block 98, which may be rectangular as shown, and is mounted and confined within a correspondingly rectangular vertically extending recess 99 formed in upper body section 18*c*, to guide block 98 for only vertical movement relative to section 18*c*. Block 98 is yieldingly urged downwardly by a rather strong spring 100. The undersurface of block 98 is horizontal, and parallel to the upper surface of section 17*c* on which card 11*c* rests, so that when block 98 is actuated downwardly with a rapid striking motion by spring 100, the block causes card 11*c* and plate 40 if present to print onto sheet 13*c*, through the carbon paper associated therewith, impressions corresponding to the raised printing on the card and plate.

Figures 14, 15, 21:
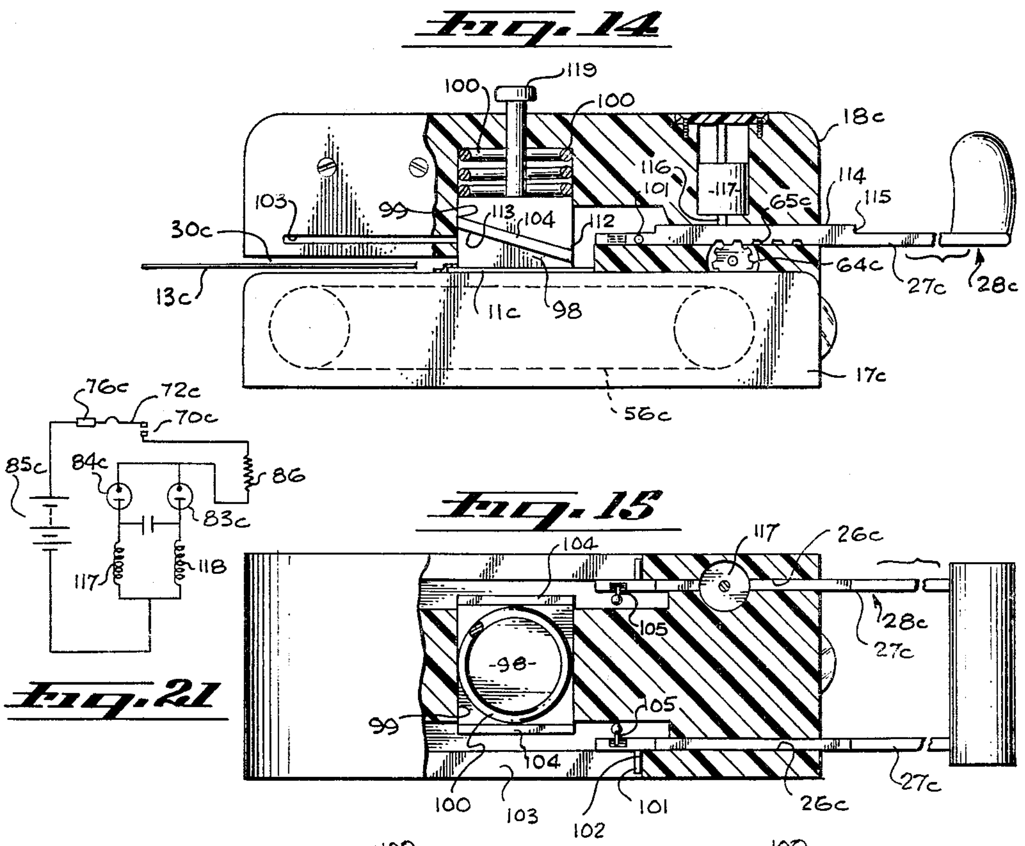
FIG. 14 is a view similar to FIG. 1, but showing still another form of the invention.
FIG. 15 is a plan view of the device shown in FIG. 14, partially broken away to show the inner mechanism of the device.
FIG. 21 is a circuit diagram of the FIG. 14 device.

The device is actuated by a handle 28*c*, having two arms 27*c* which are slidably mounted within passages 26*c* to guide the handle assembly for only horizontal movement, either left or right as seen in FIGS. 14 and 15. As in the first form of the invention, one of the arms 27*c* has rack teeth 65*c* at its underside, engageable with an idler gear 64*c* which drives belt 56*c* in correspondence with movements of the handle. The horizontal movement of the handle assembly is limited by engagement of two pins 101 carried by hadnle arms 27c with shoulders 102 and 103 formed by upper body section 18c at the opposite ends of two elongated horizontal slots 103 formed in the sides of section 18c.

As the handle 28c moves horizontally within its permitted range of movement, the two arms 27c of the handle move along two opposite sides respectively of block 98. At those opposite sides, block 98 has two parallel inclined laterally projecting cam ribs 104, which are elongated generally horizontally, as shown, and which advance progressively upwardly as they advance to the left as viewed in FIG. 14. For coaction with these ribs 104, arms 27c of the handle carry two elements 105 (FIGS. 18 and 19), which are pivoted by shafts 106 within recesses 107 for swinging movement about parallel horizontal axes 108 extending in the direction of horizontal movement of the handle structure. Each element 105 is free to swing between a horizontally inwardly projecting position approximately the same as that shown in full lines in FIG. 19, and an upwardly projecting position such as that shown in broken lines in FIG. 19. A spring 109 yieldingly urges each element 105 downwardly to its horizontally projecting position, with that actuation being limited in the directly horizontal condition by engagement of a stop shoulder 110 on each element 105 with an opposed surface or shoulder 111 on the associated arm 27c. As seen in FIG. 14, the elements 105 when projecting horizontally are at a level or height which is at least as high as the right end portion 112 of the upper surface of rib 104 as viewed in FIG. 14, and is at least as low as the left end portion 113 of the undersurface of rib 104 (the same relationship being true with respect to the second rib 104 which cannot be viewed in FIG. 14).

For locking handle 28c against leftward movement when an improper card is inserted into the device, one of the handle arms 27c has an upwardly enlarged portion 114 (FIG. 14), forming a shoulder 115 at one of its ends adapted to be engaged by the armature 116 of a solenoid 117 mounted in body section 18c. Armature 116 is normally spring urged upwardly to the illustrated retracted position, in which it is out of the path of shoulder 115 and therefore does not interfere with horizontal movement of handle 28c in either direction. However, if solenoid 117 is energized, such energization actuates armature 116 downwardly to a position in which it will interfere with rightward movement of the handle, as soon as shoulder 115 has moved to the left beyond armature 116.

As seen in FIG. 21, the electric circuit of the device shown in FIGS. 14 to 21 is identical with the circuit of FIG. 10, except for the fact that the solenoid 117 is substituted for resistor 87, and a second coil 118 having identical impedance characteristics is substituted for coil 88.

To discuss a cycle of operation of the device of FIGS. 14 through 21, it is first of all noted that the handle of this device is normally left in the rightwardly actuated position of FIG. 14, when the device is not in use. If it is desired to effect a printing operation with the device, card 11c and sheet 13c are first positioned beneath block 98. To allow such insertion of these elements beneath the block, there may be provided suitable means for elevating the block manually, as by pulling upwardly on a handle 119 at the top of the body section 18c. With the card 11c and sheet 13c in position, and block 98 bearing downwardly against the sheet, the operator first actuates handle 28c to the left as viewed in FIG. 4, and until pins 101 engage shoulders 103. This leftward movement causes the contacts corresponding to contacts 72 and 79 of the first form of the invention to scan the different series of apertures provided on belt 56c, to determine whether any of those sets of apertures corresponds to the dimples provided on the card 11c which has been placed in the device. The response of the circuit of FIG. 21 is the same as that of FIG. 10 to the previously discussed scanning operation, with lamp 83c remaining energized unless and until the circuit at contacts 70c and 72c is momentarily broken, following which the second lamp 84c is automatically energized to indicate to an operator that the card which has been presented should not be honored. Also, such energization of the second lamp 84c simultaneously energizes solenoid 117, which is in the circuit to lamp 84c, to actuate armature 116 downwardly to a position blocking rightward movement of handle 28c as soon as shoulder 115 passes the armature. Thus, the circuit automatically responds to prevent rightward printing movement of the handle when card 11c is a card which should not be honored.

Figures 16, 17:
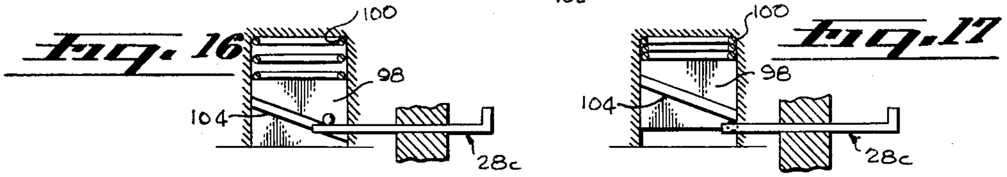
FIGS. 16 and 17 are schematic representations of the manner of operation of the unit of FIG. 14.
Figures 18, 19:
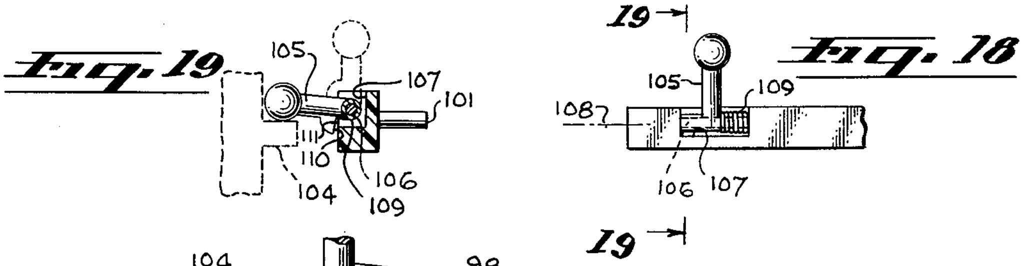
FIG. 18 is an enlarged fragmentary plan view of one of the pivoted actuating elements of the FIG. 14 device.
FIG. 19 is a view taken on line 19—19 of FIG. 18.
Figure 20:
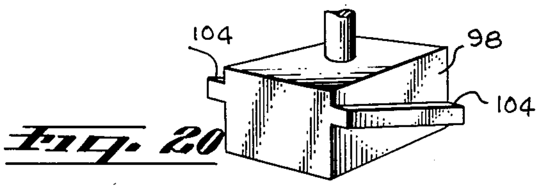
FIG. 20 is a perspective view of the printing block of FIG. 13.

As elements 105 move to the left past block 98, the spherical ends of elements 105 engage the upper surfaces 112 of cam ribs 104, and are cammed progressively upwardly thereby to pass ribs 104 without any actuation of block 98 (see FIG. 16). On the return or rightward movement of handle 28c, if such movement is permitted by solenoid 117, the spherical ends of elements 105 engage the undersurfaces 113 of cam ribs 104, and by virtue of that engagement act to cam block 98 progressively upwardly (see FIG. 17) until elements 105 move completely beyond ribs 104, at which time block 98 is rapidly urged downwardly by spring 100 with a striking or hammering action acting to cause card 11c and the associated plate 40 of FIG. 9 to print the desired impressions onto work sheet 13c. It will of course be understood that, in order to allow for a proper functioning of the scanning apparatus, the apertures in belt 56c must be so located as to always maintain the end contact corresponding to contact 79 of FIG. 5 within one of the end apertures 68, except when one of the sets of apertures is actually being compared with the dimples on card 11c. This is true even in the extreme end positions of the handle.

FIG. 22 is a view similar to FIG. 3, but showing a reversed type of electrical contact 72d, adapted for use where the dimples 14d of card 11d are deformed upwardly instead of downwardly. In this arrangement, the various contacts 72d are all formed separately and have first upwardly directed hemispherical ends 73d receivable within dimples 14d. The opposite ends 75d are projectable downwardly through apertures 67d in the band or strip 56d, and into contact with bus bar 70d. At a location intermediate its two ends, each contact 72d is pivoted at 300 to swing about a horizontal axis as end 73d moves into and out of a dimple 14d. A spring 301 urges the contact pivotally in a direction to move end 73d upwardly and to thereby move end 75d downwardly into engagement with bus bar 70d. Contacts 72d are connected into the control circuit in the same manner as are contacts 72 of FIG. 3, and have the same overall effect during a scanning operation. The electrical connections to the contacts 72d may be made through their pivot mountings 302, which may be insulated from the body of the device by an insulative mounting 78d.

I claim:

1. Apparatus for use with a series of cards or the like having information thereon including different identifying indicia on the different cards, said apparatus being adapted to receive and simultaneously support an individual one of said cards and also a sheet carrying indicia representing a predetermined group of said cards but not all of them, means for making a record of at least some of the information on said one card while it is supported by said apparatus, means for advancing said sheet along a predetermined path, scanning means for comparing said indicia on said sheet with the indicia on said one card as the sheet advances and including means for indicating to an operator when the indicia on said sheet includes indicia representing said one card, and a common actuating mechanism for simultaneously actuating said record making means and said sheet advancing means.

2. Apparatus as recited in claim 1, in which said indicia on the card and sheet are irregularities formed thereon, said scanning means including a plurality of individual electrical contacts engageable with and actuable by said irregularities on said one card and on said sheet, and an electrical circuit including said contacts and operable thereby to indicate to an operator when some of the irregularities on said sheet are in a pattern corresponding to the irregularities on said one card and therefore represent said one card.

3. Apparatus as recited in claim 1, in which said sheet is in the form of an endless belt, and said sheet advancing means includes means for advancing said belt along an endless path.

4. Apparatus as recited in claim 1, in which said indicia on the card and sheet are irregularities formed thereon, said scanning means including a plurality of individual electrical contacts each adapted to simultaneously engage an irregularity on said card and an irregularity on said sheet and to be actuated between open and closed positions when thus engaged by two irregularities, and an electrical circuit having said contacts connected thereinto in parallel with one another and electrically operable thereby to indicate to an operator when a set of irregularities on the sheet corresponds to the irregularities on said one card.

5. Apparatus as recited in claim 1, in which said indicia on the card and sheet are irregularities formed thereon, said scanning means including two sets of electrical contacts engageable with and actuable by said irregularities on the sheet and card respectively, and an electrical circuit having corresponding ones of the contacts of said two sets connected in series with one another and operable to indicate to an operator when some of the irregularities on said sheet are in a pattern corresponding to the irregularities on said one card and therefore represent said one card.

6. Apparatus for use with a series of identification cards and an endless belt, each of said cards having raised printing thereon and also a series of coded irregularities designating the holder of the card, said belt having a series of sets of irregularities thereon corresponding to said irregularities on different ones of said cards, said apparatus comprising a structure having an upwardly facing surface for receiving one of said cards at a predetermined location, means above said surface for printing onto a record sheet an impression of said raised printing on said one card while the latter is at said location, a manually actuable handle for operating said printing means, means within said structure and beneath said upwardly facing surface for advancing said belt along an endless path, mechanism for actuating said belt advancing means in response to movement of said handle, a plurality of electrical contacts beneath said upwardly facing surface and positioned to engage and be actuated by the irregularities on said card and said belt, and an electrical circuit including said contacts and operable to indicate to an operator when some of the irregularities on said belt are in a pattern corresponding to the irregularities on said one card and therefore represent said one card.

7. Apparatus as recited in claim 6, in which said circuit includes means for preventing the printing movement of said handle when some of the irregularities on said belt correspond to the irregularities on said one card.

8. Apparatus as recited in claim 6, in which said circuit includes an electrically actuated stop for preventing the printing movement of said handle when some of the irregularities on said belt correspond to the irregularities on said one card.

9. Apparatus for use with a series of cards or the like having information thereon including different groups of identifying indicia on the different cards respectively, said apparatus being constructed to simultaneously hold an individual one of said cards and also an element carrying a series of different groups of indicia corresponding respectively to some but not all of said groups of indicia on different ones of said cards, means for making a record of at least some of the information on said one card while it is held by said apparatus, and scanning means operable to successively compare said different groups of indicia on said element with said indicia on said one card while the card and element are held by said apparatus, said scanning means being constructed to respond automatically when any one of said groups of indicia on said element corresponds to the group of indicia on said one card and therefore represents said one card.

10. Apparatus for use with a series of cards or the like having information thereon including different groups of identifying indicia on the different cards respectively, said apparatus being constructed to simultaneously hold an individual one of said cards and also an element carrying a series of different groups of indicia corresponding respectively to some but not all of said groups of indicia on different ones of said cards, means for making a record of at least some of the information on said one card while it is held by said apparatus, scanning means operable to successively compare said different groups of indicia on said element with said indicia on said one card while the card and element are held by said apparatus, said scanning means being constructed to respond automatically when any one of said groups of indicia on said element corresponds to the group of indicia on said one card and therefore represents said one card, and a control for said scanning means constructed to require that the scanning means be actuated through a predetermined scanning cycle each time that said record making means are actuated to record information from a card and the card is then removed from the apparatus.

11. Apparatus for use with a series of cards or the like having information thereon including different groups of identifying indicia on the different cards respectively, said apparatus being constructed to simultaneously hold an individual one of said cards and also an element carrying a series of different groups of indicia corresponding respectively to some but not all of said groups of indicia on different ones of said cards, means for making a record of at least some of the information on said one card while it is held by said apparatus, scanning means for comparing said indicia on said element with said indicia on said one card, and means for relatively moving said element and said scanning means so that the latter compares said different groups of indicia on said element successively with said indicia on said one card while the card and element are held by said appartaus, said scanning means being constructed to respond automatically when any one of said groups of indicia on said element corresponds to the group of indicia on said one card and therefore represents said one card.

12. Apparatus for use with a series of cards or the like having information thereon including different groups of identifying indicia on the different cards respectively, said apparatus being constructed to simultaneously hold an individual one of said cards and also an element carrying a series of different groups of indicia corresponding respectively to some but not all of said groups of indicia on different ones of said cards, means for making a record of at least some of the information on said one card while it is held by said apparatus, scanning means for comparing said indicia on said element with said indicia on said one card, means for relatively moving said element and said scanning means so that the latter compares said different groups of indicia on said element successively with said indicia on said one card while the card and element are held by said apparatus, said scanning means being constructed to respond automatically when any one of said groups of indicia on said element corresponds to the group of indicia on said one card and therefore represents said one card, and a control for said moving means constructed to require that said element and said scanning means move relatively through a predetermined scanning cycle each time that said record making means are actuated to record information from a card and the card is then removed from the apparatus.

13. Apparatus for use with a series of cards or the like having different arrangements of raised letters formed thereon and having different groups of identifying indicia in addition to said letters on the different cards respectively, said apparatus being constructed to simultaneously hold an individual one of said cards and also an element carrying a series of different groups of indicia corresponding respectively to some but not all of said groups of indicia on different ones of said cards, means for printing impressions of said raised letters which are on said one card onto a record sheet while said one card is held by said apparatus, scanning means for comparing said indicia on said element with said indicia on said one card, means for relatively moving said element and said scanning means so that the latter compares said different groups of indicia on said element successively with said indicia on said one card while the card and element are held by said apparatus, said scanning means being constructed to respond automatically when any one of said groups of indicia on said element corresponds to the group of indicia on said one card and therefore represents said one card, and a control for said moving means constructed to require that said element and said scanning means move relatively through a predetermined scanning cycle each time that said record making means are actuated to record information from a card and the card is then removed from the apparatus.

14. Apparatus for use with a series of cards or the like having information thereon including different groups of identifying indicia on the different cards respectively, said apparatus being constructed to simultaneously hold an individual one of said cards and also an element carrying a series of different groups of indicia corresponding respectively to some but not all of said groups of indicia on different ones of said cards, a camera for making a photographic record of at least some of the information on said one card while it is held by said apparatus, scanning means for comparing said indicia on said element with said indicia on said one card, means for relatively moving said element and said scanning means so that the latter compares said different groups of indicia on said element successively with said indicia on said one card while the card and element are held by said apparatus, said scanning means being constructed to respond automatically when any one of said groups of indicia on said element corresponds to the group of indicia on said one card and therefore represents said one card, and a control for said moving means constructed to require that said element and said scanning means move relatively through a predetermined scanning cycle each time that said camera is actuated to record information from a card and the card is then removed from the apparatus.

15. Apparatus for use with a series of cards or the like having information thereon including different groups of identifying indicia on the different cards respectively, said apparatus being constructed to simultaneously hold an individual one of said cards and also an element carrying a series of different groups of indicia corresponding respectively to some but not all of said groups of indicia on different ones of said cards, means for making a record of at least some of the information on said one card while it is held by said apparatus, scanning means for comparing said indicia on said element with said indicia on said one card, means for relatively moving said element and said scanning means so that the latter compares said different groups of indicia on said element successively with said indicia on said one card while the card and element are held by said apparatus, said apparatus including an indicator adapted to automatically respond, and indicate to an operator, when any one of said groups of indicia on said element corresponds to the group of indicia on said one card and therefore represents said one card, and a control for said moving means constructed to require that said element and said scanning means move relatively through a predetermined scanning cycle each time that said record making means are actuated to record information from a card and the card is then removed from the apparatus.

16. Apparatus for use with a series of cards or the like having information thereon including different groups of identifying indicia on the different cards respectively, said apparatus being constructed to simultaneously hold an individual one of said cards and also an element carrying a series of different groups of indicia corresponding respectively to some but not all of said groups of indicia on different ones of said cards, means for making a record of at least some of the information on said one card while it is held by said apparatus, scanning means for comparing said indicia on said element with said indicia on said one card, means for relatively moving said element and said scanning means so that the latter compares said different groups of indicia on said element successively with said indicia on said one card while the card and element are held by said apparatus, said scanning means being constructed to respond automatically when any one of said groups of indicia on said element corresponds to the group of indicia on said one card and therefore represents said one card, and a common control for actuating both said record making means and said means for relatively moving the element and scanning means.

17. Apparatus as recited in claim 16, in which said control includes a manually movable actuating handle, and means operatively connecting both said record making means and said moving means to said handle for actuation thereby.

18. Apparatus for use with a series of cards or the like having information thereon including different groups of identifying irregularities on the different cards respectively, said apparatus being constructed to simultaneously hold an individual one of said cards and also an element carrying a series of different groups of irregularities corresponding respectively to some but not all of said groups of irregularities on different ones of said cards, means for making a record of at least some of the information on said one card while it is held by said apparatus, a plurality of scanning parts responsive to the irregularities on said element and on said card and operable to compare said irregularities, means for relatively moving said element and said scanning parts in a relation bringing the scanning parts into positions to respond to said different groups of irregularities on said element successively, and a control for said moving means constructed to require that said scanning parts and said element move relatively through a predetermined scanning cycle each time that said record making means are actuated to record information from a card and the card is then removed from the apparatus.

19. Apparatus as recited in claim 18, in which said scanning parts are a plurality of electrical contacts actuable by said irregularities on said one card and on said element.

20. Apparatus for use with a series of cards or the like having information thereon including different groups of identifying indicia on the different cards respectively, said apparatus being constructed to simultaneously hold an individual one of said cards and also an element carrying a series of different groups of indicia corresponding respectively to some but not all of said groups of indicia on different ones of said cards, means for making a record of at least some of the information on said one card while it is held by said apparatus, scanning means for comparing said indicia on said element with said indicia on said one card, said element being a sheet of material carrying said indicia, means for advancing said sheet along a predetermined path past said scanning means so that the latter compares said different groups of indicia on the sheet successively with said indicia on said one card as the sheet is advanced, and a control for said advancing means constructed to require that said sheet be advanced through a predetermined scanning cycle each time that said record making means are actuated to record information from a card and the card is then removed from the apparatus.

21. Apparatus for use with a series of cards or the like having information thereon including different groups of identifying indicia on the different cards respectively, said apparatus being constructed to simultaneously hold an individual one of said cards and also an element carrying a series of different groups of indicia corresponding respectively to some but not all of said groups of indicia on different ones of said cards, means for making a record of at least some of the information on said one card while it is held by said apparatus, scanning means operable to successively compare said different groups of indicia on said element with said indicia on said one card while the card and element are held by said apparatus, and means for automatically preventing the actuation of said record making means if any one of said groups of indicia on said element corresponds to the group of indicia on said one card and therefore represents said one card.

References Cited in the file of this patent

UNITED STATES PATENTS

| | | |
|---|---|---|
| 1,257,480 | Griswold | Feb. 26, 1918 |
| 1,372,804 | Dorsey et al. | Mar. 29, 1921 |
| 1,481,860 | Duncan | Jan. 29, 1924 |
| 1,492,861 | Smart | May 6, 1924 |
| 1,556,929 | Gollnick et al. | Oct. 13, 1925 |
| 1,562,904 | Miller | Nov. 24, 1925 |
| 1,581,726 | Elliott | Apr. 20, 1926 |
| 1,599,623 | Rainey | Sept. 14, 1926 |
| 1,644,229 | Block | Oct. 4, 1927 |
| 2,624,273 | Wheeler | Jan. 6, 1953 |
| 2,712,788 | Brown | July 12, 1955 |